(12) United States Patent
Hohmann

(10) Patent No.: US 12,308,651 B2
(45) Date of Patent: May 20, 2025

(54) CIRCUIT ARRANGEMENT FOR DECOUPLING A RECHARGEABLE BATTERY OF AN INVERTER

(71) Applicant: ZF Friedrichshafen AG, Friedrichshafen (DE)

(72) Inventor: Fabian Hohmann, Hofbieber (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/392,163

(22) Filed: Dec. 21, 2023

(65) Prior Publication Data

US 2024/0213782 A1 Jun. 27, 2024

(30) Foreign Application Priority Data

Dec. 22, 2022 (DE) .......................... 102022214263.2

(51) Int. Cl.
*H02J 3/36* (2006.01)
*B60L 50/51* (2019.01)
*B60L 50/60* (2019.01)

(52) U.S. Cl.
CPC ................ *H02J 3/36* (2013.01); *B60L 50/51* (2019.02); *B60L 50/66* (2019.02); *B60L 2210/42* (2013.01); *H02J 2310/48* (2020.01)

(58) Field of Classification Search
None
See application file for complete search history.

(56) References Cited

U.S. PATENT DOCUMENTS

2020/0274375 A1* 8/2020 Griffiths .................... H02J 7/24
2021/0218242 A1* 7/2021 Mensch ................. H02H 3/087

FOREIGN PATENT DOCUMENTS

DE  10 2009 019 531 A1  12/2009
EP  3 279 024 A1  2/2018

OTHER PUBLICATIONS

Office Action dated Sep. 15, 2023 for German Patent Application No. 10 2022 214 263.2 (17 pp.), note: pp. 1 and 2 are English language Explanations to Section C. Result of Determination Document.

\* cited by examiner

*Primary Examiner* — Jared Fureman
*Assistant Examiner* — Aqeel H Bukhari
(74) *Attorney, Agent, or Firm* — Crowell & Moring LLP

(57) ABSTRACT

A circuit arrangement for decoupling a rechargeable battery from a DC link of an inverter in the event of a fault is arranged in a pole line between the battery and the DC link. Each pole line is formed from a first path having a first power semiconductor that is low-voltage or low-resistance and a mechanical switching element connected in series therewith, and a second path connected in parallel with the first path having a high-voltage power semiconductor which is high-blocking from the DC link in the direction of the battery. During normal operation, the first power semiconductor, mechanical switching element are closed. During a fault, the first power semiconductor, the mechanical switching element, and the high-voltage power semiconductor are opened in this order and in each case in dependence on a present current and/or voltage state in the circuit arrangement.

10 Claims, 1 Drawing Sheet

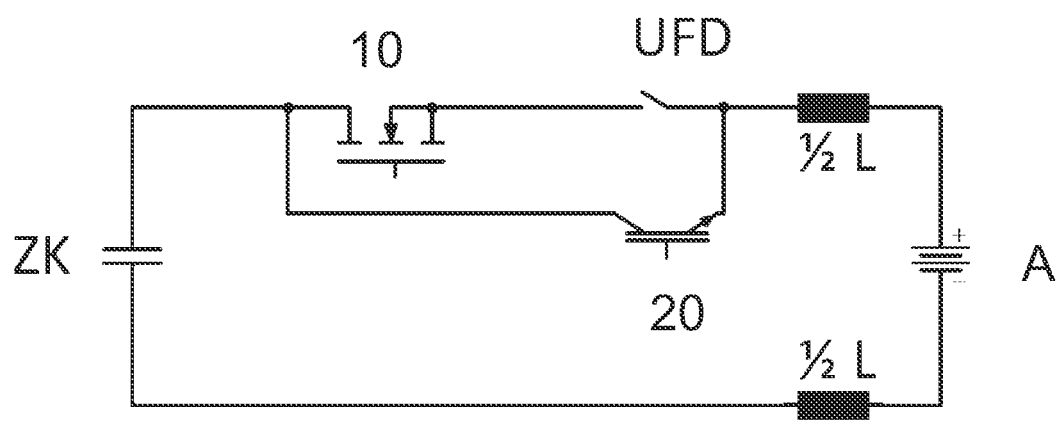

CIRCUIT ARRANGEMENT FOR DECOUPLING A RECHARGEABLE BATTERY OF AN INVERTER

CROSS-REFERENCE TO RELATED APPLICATION

This application claims priority to German Application No. 10 2022 214 263.2, filed on Dec. 22, 2022, the entirety of which is hereby fully incorporated by reference herein.

FIELD

The present disclosure relates to the field of electromobility, in particular that of electronics modules for an electric drive.

BACKGROUND

The use of electronics modules, for example power electronics modules, in motor vehicles has significantly increased in past decades. This can be attributed, on the one hand, to the necessity of improving the fuel economy and the vehicle performance and, on the other hand, to the advances in semiconductor technology. The main component part of such an electronics module is an inverter which serves the purpose of energizing electric machines such as electric motors or generators with a polyphase alternating current (AC). In this case, a direct current generated by means of a DC energy source, for example a battery, is converted into a polyphase alternating current. For this purpose, the inverters comprise a multiplicity of electronics component parts with which bridge circuits (for example half-bridges) are realized, for example semiconductor power switches, which are also referred to as power semiconductors.

For the safe operation of inverters, in particular traction inverters, the control of fault cases is vital. The fault causes in the case of a traction converter are varied. Each of the six topological switches which are generally present can in this case turn out to be blocking or conducting. The effects are in this case different. In addition, the working point of the electric machine and the machine type itself also have an influence on the fault case. Depending on the fault case, the other switches need to be switched on or off. The possible fault types are in this case varied and the resultant problems are almost unimaginable. The aim is in this case in principle always the prevention of the discharge of the rechargeable battery.

Present solutions differ from each other in two approaches. One possibility is the use of pyrotechnic battery disconnection systems, also referred to as pyrofuses. In this case, each fault case can be treated identically, and a high degree of reliability is provided. However, in the event of a fault, irreversible damage of the drive train is present owing to detonation and the fitters require training in explosives. The present alternative of using a targeted switching strategy has the advantage that no additional component parts are required. However, a comprehensive fault analysis and complex drive strategies are required. The driving of the power semiconductors takes place in the case of a high current and voltage flanks and high temperatures, with the result that this strategy is susceptible to faults. In addition, relatively long response times are present, i.e. several milliseconds, until the microcontroller can respond. And in addition, the power supply to the driver needs to be ensured.

SUMMARY

Therefore, the present disclosure is based on an object of providing a circuit arrangement which enables improved decoupling of a rechargeable battery of an at least partially electrically driven vehicle in the event of a fault.

This object is achieved by the features disclosed herein. Advantageous configurations are also disclosed herein.

What is proposed is a circuit arrangement for decoupling a rechargeable battery from a DC link of an inverter of an at least partially electrically driven vehicle in the event of a fault, wherein the circuit arrangement is arranged in at least one pole line between the rechargeable battery and the DC link, and each pole line is formed from a first path having at least one low-voltage or LV power semiconductor, alternatively a low-resistance power semiconductor having a low blocking capacity and a mechanical switching element connected in series therewith, and a second path, which is connected in parallel with the first path and has at least one high-voltage or HV power semiconductor which is high-blocking from the DC link in the direction of the rechargeable battery, wherein, in the case of normal operation, the power semiconductor and the mechanical switching element are closed, and wherein the circuit arrangement can also be driven in such a way that, in the event of a fault, the power semiconductor, the mechanical switching element and the high-voltage power semiconductor are opened in this order and in each case in dependence on a present current and/or voltage state in the circuit arrangement.

In one embodiment, the power semiconductor of the power semiconductor is in the form of a MOSFET. In one embodiment, the power semiconductor of the HV power semiconductor is in the form of a MOSFET or an IGBT. In one embodiment, the mechanical switching element is an ultrafast disconnector.

In one embodiment, cooling of the at least one power semiconductor is provided. In one embodiment, a plurality of power semiconductors is provided which are connected in parallel with one another.

In addition, an electric drive of a vehicle, having the circuit arrangement, and a vehicle, having the electric drive, are proposed.

In addition, a method for driving the circuit arrangement is proposed, wherein, during normal operation, the power semiconductor, the mechanical switching element and the HV power semiconductor are closed, and, in the event of a fault, the driving takes place in such a way that first the power semiconductor is opened, and, as soon as the current has commutated into the HV power semiconductor, the mechanical switching element is opened under a low current and voltage load, with the result that the HV power semiconductor draws the energy stored in the distributed inductance between the rechargeable battery and the DC link, and, once it has drawn the stored energy, the HV power semiconductor is opened.

In one embodiment, in the event of a fault, first all of the topological switches of the inverter are opened.

Further features and advantages of the present disclosure result from the description below of exemplary embodiments, with reference to the figures in the drawings which show details according to the present disclosure, and from the claims.

The individual features can in each case be implemented individually per se or together in any desired combination in one variant of the present disclosure.

Preferred embodiments of the present disclosure will be explained in more detail below with reference to the attached drawings.

BRIEF DESCRIPTION OF THE DRAWING

FIG. 1 shows a basic design of a circuit arrangement in accordance with one embodiment of the present disclosure.

DETAILED DESCRIPTION

In the description of the figures below, identical elements or functions are provided with the same reference signs.

An aim of the present disclosure is to provide decoupling of the rechargeable battery of an at least partially electrically driven vehicle from the electric drive or the inverter in the event of a fault in a manner which is as simple and reliable as possible. For this purpose, the circuit arrangement described below is proposed.

FIG. 1 shows the proposed circuit arrangement between the DC link ZK of the inverter and the rechargeable battery A of the vehicle. In FIG. 1, the circuit arrangement is provided in the line of the positive pole (+) of the rechargeable battery. However, it is also possible for it to be provided in the line of the negative pole (−) or in the two pole lines. The circuit arrangement always has two switching phases or paths which are connected in parallel with one another, of which one is referred to as the first path and the other is referred to as the second path below. The first path and the second path are therefore connected in parallel with one another.

The second path has at least one HV power semiconductor 20. The HV power semiconductor 20 is in the form of a high-blocking transistor, for example a MOSFET or advantageously an IGBT.

The first path has at least one power semiconductor 10 or a low-resistance power semiconductor 10 having a low blocking capacity, referred to below as power semiconductor 10 for short, and a mechanical switching element UFD connected in series therewith. The opening of the mechanical switching element UFD is reversible. Therefore, once the rechargeable battery A has been disconnected, it can be connected to the inverter again as soon as the fault event is no longer present. The power semiconductor 10 is arranged closer to the DC link ZK than the mechanical switching element UFD. The mechanical switching element UFD is advantageously in the form of an ultrafast disconnector.

The power semiconductor 10 is advantageously in the form of a MOSFET which causes as few line losses as possible, i.e., for example, in the form of a MOSFET having as small an intrinsic layer as possible, for example a MOSFET consisting of silicon Si. The power semiconductor 10 is characterized in particular by a low bulk resistance, but also low costs.

During normal operation, i.e. during fault-free operation, the power semiconductor 10, the mechanical switching element UFD and the HV power semiconductor 20 are closed, i.e. conducting. Owing to the mechanical connection provided by the mechanical switching element UFD and the low blocking voltage of the power semiconductor 10, energy transmission with low losses can take place from the rechargeable battery A into the DC link ZK. The voltage drop across the power semiconductor 10 can be further reduced by a parallel circuit. Depending on the transmission power and the semiconductor area, cooling of the power semiconductor 10 may be necessary.

In parallel with the first path there is, in the second path, a high-blocking HV power semiconductor 20, which is advantageously in the form of an IGBT. Should a fault event now arise, the power semiconductor 10 is first opened, with the result that it is no longer conducting. The voltage drop brought about as a result is sufficient for pushing the current into the high-blocking HV power semiconductor 20. As soon as the current has commutated, the mechanical switching element UFD opens and makes it possible for the high-blocking HV power semiconductor 20 to draw all of the energy stored in the distributed inductance L between the rechargeable battery A and the DC link ZK. Directly thereafter, the high-blocking HV power semiconductor 20 is opened, interrupts the current flow and in the process discharges the commutation inductance L. The chip area of the high-blocking HV power semiconductor 20 results owing to the energy stored in the commutation inductance L. Therefore, the commutation inductance L should be kept as low as possible.

A fault event is assumed when, for example, the voltage at the DC link ZK exceeds a preset value. This voltage is presently already monitored, with the result that it can be used for controlling the mechanical switching element UFD. However, it is also possible for other suitable signals to be used as trigger signal in order to switch the mechanical switching element UFD.

As long as the rechargeable battery A is not decoupled from the DC link ZK in the event of a fault, energy flows back into the rechargeable battery A. This needs to be prevented by disconnection of the rechargeable battery A from the DC link ZK in order to avoid, for example, burning away of the rechargeable battery A.

By way of example, a fault event will be described below in which the so-called 6SO state ("all-phase cut-off") is always set in the inverter. That is to say that as soon as a fault event occurs, all of the topological switches are therefore opened (in order that they are no longer conducting). This state can in this case often be reached most easily since the topological switches are self-blocking. The state can in this case also be realized in the event of failure of the driver electronics. Thus, the electric motor operates as a generator, i.e. in the rectifier mode of operation, and charges the DC link.

The maximum voltage is in this case provided by the electromotive force of the electric motor. Up until charging, a torque is present at the vehicle. Since the DC link ZK is small, this torque is only present for a short time. Thereafter, the vehicle is torque-free.

Owing to the simple circuit arrangement between the DC link ZK and the rechargeable battery A, simple disconnection of the rechargeable battery A can take place without explosive needing to be used. In addition, the mechanical switching element UFD replaces a contactor and the opening is reversible. In addition, the blocking only needs to be ensured in the load direction from the inverter (DC link ZK) in the direction of the rechargeable battery A. The power semiconductors 10, 20 therefore do not need to be able to draw blocking voltage in both directions.

In addition, the topological switches can be designed to be bidirectionally blocking. As a result, discharge of the rechargeable battery A can be prevented even in the case of a bridge short circuit.

In order to increase the failsafety, certain component parts can also be designed to be doubled.

For additional safety, the disconnection can take place for all poles. A simple contactor which is only opened after the demagnetization of the positive line is sufficient in this case for the negative line.

In addition, a pyrotechnic battery disconnection system (pyrofuse) can still be provided.

Owing to the proposed circuit arrangement and the drive method, much simplified fault handling and reversible disconnection of the rechargeable battery A from the inverter, more precisely from the DC link ZK thereof, can take place.

The circuit arrangement is preferably used in a vehicle equipped with an electric drive.

LIST OF REFERENCE SIGNS 10 power semiconductor, in this case MOSFET
20 HV power semiconductor, in this case IGBT
UFD mechanical switching element
A rechargeable battery
L commutation inductance
ZK DC link

The invention claimed is:

1. A circuit arrangement for decoupling a rechargeable battery from a DC link of an inverter of an at least partially electrically driven vehicle in the event of a fault,
wherein the circuit arrangement is arranged in at least one pole line between the rechargeable battery and the DC link, wherein the at least one pole line comprises:
a first path having at least one first power semiconductor and a mechanical switching element connected in series therewith, wherein the at least one first power semiconductor is at least one low-voltage power semiconductor or at least one low-resistance power semiconductor; and
a second path, which is connected in parallel with the first path and which has at least one high-voltage power semiconductor which is high-blocking from the DC link in a direction of the rechargeable battery,
wherein, during normal operation, the at least one first power semiconductor and the mechanical switching element are configured to be closed, and
wherein, in the event of a fault, the circuit arrangement is configured to be driven in such a way that to open the at least one first power semiconductor, then open the mechanical switching element, and then open the at least one high-voltage power semiconductor, in this order and in each case in dependence on a present current and/or voltage state in the circuit arrangement.

2. The circuit arrangement according to claim 1, wherein the mechanical switching element comprises an ultrafast disconnector.

3. The circuit arrangement according to claim 1, wherein the at least one first power semiconductor is a MOSFET.

4. The circuit arrangement according to claim 1, wherein the at least one high-voltage power semiconductor is a MOSFET or an IGBT.

5. The circuit arrangement according to claim 1, wherein cooling of the at least one first power semiconductor is provided.

6. The circuit arrangement according to claim 1, wherein the at least one power semiconductor comprises a plurality of power semiconductors connected in parallel with one another.

7. An electric drive of a vehicle, comprising:
the circuit arrangement according to claim 1.

8. A vehicle, comprising:
the electric drive according to claim 7.

9. A method for driving a circuit arrangement for decoupling a rechargeable battery from a DC link of an inverter of an at least partially electrically driven vehicle in the event of a fault,
wherein the circuit arrangement is arranged in at least one pole line between the rechargeable battery and the DC link, wherein the at least one pole line comprises:
a first path having at least one first power semiconductor and a mechanical switching element connected in series therewith, wherein the at least one first power semiconductor is at least one low-voltage power semiconductor or at least one low-resistance power semiconductor; and
a second path, which is connected in parallel with the first path and which has at least one high-voltage power semiconductor which is high-blocking from the DC link in a direction of the rechargeable battery;
the method comprising:
closing the at least one first power semiconductor, the mechanical switching element, and the at least one high-voltage power semiconductor during normal operation; and
opening the at least one first power semiconductor, the mechanical switching element, and the at least one high-voltage power semiconductor in the event of a fault, wherein opening the at least one first power semiconductor, the mechanical switching element, and the at least one high-voltage power semiconductor further comprises:
opening the at least one first power semiconductor;
as soon as a current has commutated into the at least one high-voltage power semiconductor, opening the mechanical switching element under a low current and voltage load, such that the at least one high-voltage power semiconductor draws energy stored in a distributed inductance between the rechargeable battery and the DC link; and
once the at least one high-voltage power semiconductor has drawn the stored energy, opening the at least one high-voltage power semiconductor.

10. The method according to claim 9, comprising:
opening first all topological switches of the inverter in the event of a fault.

* * * * *